Oct. 18, 1932.  H. E. IRWIN  1,883,740
AIRPLANE
Filed May 31, 1930
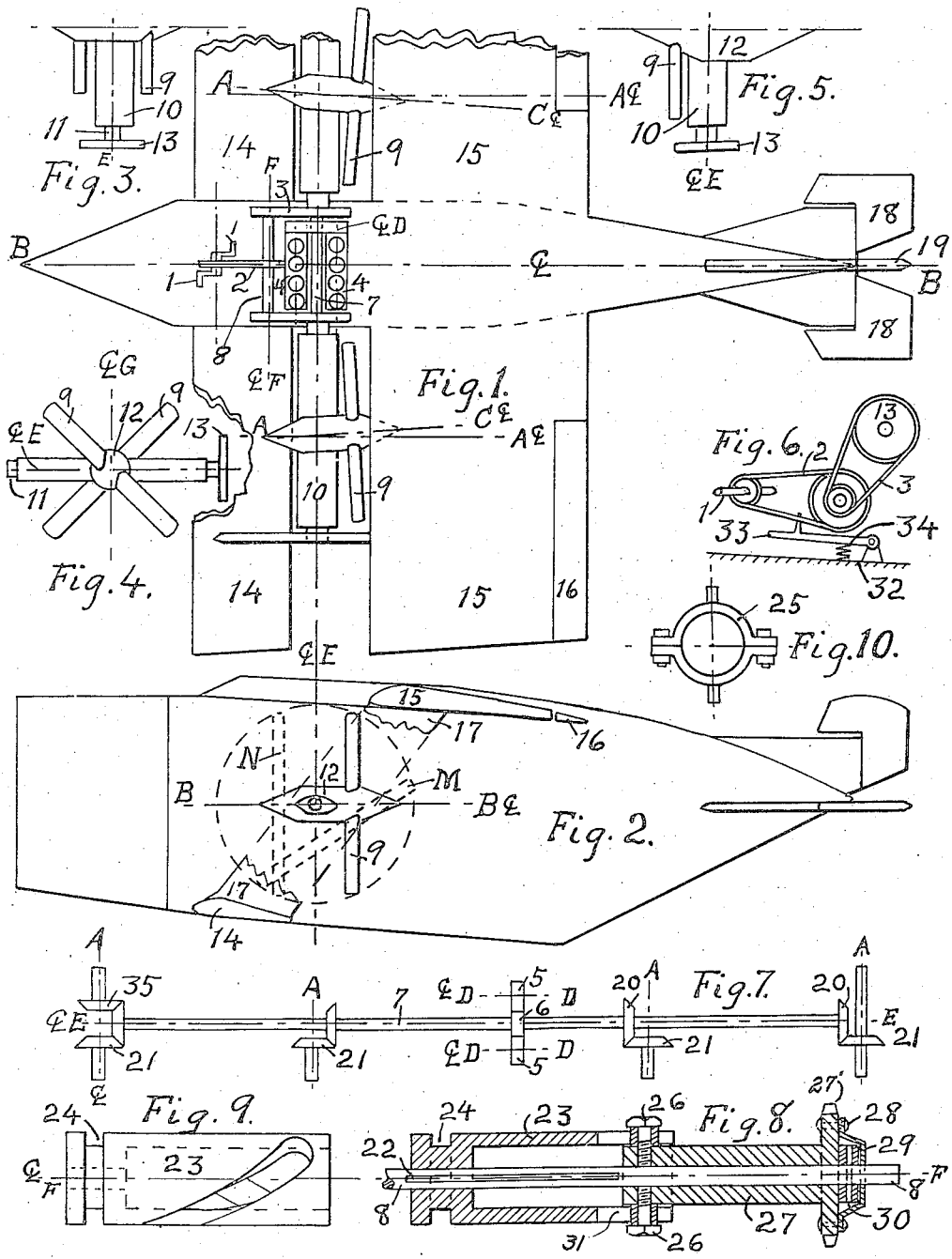
WITNESS:  
Ellwood R. Irwin
INVENTOR  
Herbert E. Irwin.

Patented Oct. 18, 1932

1,883,740

UNITED STATES PATENT OFFICE

HERBERT ELLWOOD IRWIN, OF BARONS, ALBERTA, CANADA

AIRPLANE

Application filed May 31, 1930. Serial No. 458,813.

This invention relates to improvements in airplanes in which the propellers are located at its sides instead of in front as is the common practice of today, the propellers are secured to sleeve members which may be oscillated at the will of the pilot into any desired position and by doing so changes the axis of rotation of the propellers so that the air that leaves the propellers is forced to the rear, down and back, straight down or forward 180 degrees turn from straight back or any position between.

The advantages are for shorter runs to take to the air and a more rapid climb as the motor's power can be used directly in lifting and not depend entirely on wing lift and on landing the motor's power may be used to hold the plane in part in the air after the speed is too slow for the wings to hold the plane up and by bringing the propellers into a complete reverse after the plane has touched the ground, brings the plane to a very quick stop by motor power.

To bring about greater safety, I use two motors, both gear connected to the drive shaft, each to use clutches, either motor to have enough power to fly alone, being located within the fuselage where they are accessible, while in the air, repairs or changes can be made on a balking motor to get it to function again without any mishap or forced landing.

A heater within the fuselage makes it easy, in cold weather, to make it warm and start the motors; quite different to motors exposed to the outside air of most airplanes.

Other advantages will be mentioned later on.

In the accompanying drawing, in which Fig. 1 is a plan view, with the upper part of the fuselage removed to show the motor and counter shaft parts; and right wing tips shown broken off for lack of room; Fig. 2 is a side view of the plane with the web member broken away to show the propellers and sleeve member; doors, windows and landing gear are not shown as they do not enter into any part of this invention.

Fig. 3 is ½ top view and Fig. 4 front view of a sleeve member having two blades in front and two blades back.

Fig. 5 is ½ view of propellers attached to sleeve member with a large central housing to inclose an electric motor.

Electric motors in the future may be made strong and light and be quite suitable for airplane use.

Fig. 6 shows an end or side view of sprockets and chains; as it were removed from Fig. 2, and plan view of same parts shown in Fig. 1. Fig. 7 shows a drive shaft, motor drive gears and two sets of bevel gears on either side, teeth are not shown but drawn as blank or smooth surface.

Fig. 7 shows the relation of parts to make use of two or more propellers on a side suitable for planes of wide wing spread. Figs. 8, 9 and 10 show a device to be placed on the counter shaft, its object is to enable the pilot to alter the axis position of the propellers on one side to lift that side of the plane, the lifting effect on that side would stop as soon as the two propellers axes become parallel again.

The common construction now is to have hinge wing parts known as ailerons whereby the pilot maintains his balance or banks his plane by lowering one side or the other. It is known when planes stall by losing speed due to a too great angle of climb, rudders become next to useless. Should a pilot be landing his plane with axis of the propellers vertical, then the device in Figs. 8, and 9, would not be as effective as in a more horizontal position. In a way there is a similarity of a motor car propeller shaft and rear axle to the drive of my propellers the differential is done away with in mine and the propellers on either side have equal speed.

In the tri-motor plane it frequently happens, that the outside motors run at different speeds and interfere with steering. By having the propellers on both sides it will be observed that the air that passes through the space where the propellers revolve, strikes the sleeve member which has in its center the bevel gear housing; the sleeve member preferably has a flat bottom and a flattened oval top, quite similar to the shape of plane wing and will aid the plane to fly and again by having its greatest dimension with that of the axis of the propellers thereby giving greater stiffness to carry the load that the revolving propellers make.

The common front motor type has a blunt surface on the front end of the fuselage which retards the movement of the plane, cuts down speed and requires more motor power. My plane on the other hand has a knife or chisel front edge.

The fuselage penetrates the air with minimum resistance, spreads the air sideways thereby forming a zone of compressed air right in front of the propellers which gives a great advantage not found on other planes.

The front drive plane fuselage is in an artificial air stream plus the air due to the plane speed.

My propellers being at the side of the fuselage the artificial air currents made by the propellers are decidedly at the side of the fuselage, which means that the fuselage part moves forward in no artificial air current.

By referring to Fig. 1, dot and dash center lines (₵) A. A. and A. A. are parallel to C. L. of the plane B. B. while C. L. of A. C. and A. C. is at an angle to B. B. The reason for this is to crowd in slightly the air currents so that the tapering back end of the fuselage will not form in any way a vacuum and retard its progress.

Fig. 1 shows two cranks 1, chain 2, and chains 3, 3; also see Fig. 6.

The cranks are quite similar to pedals, sprockets and chain of a bicycle.

The dimensions of the plane have a great deal to do with the arrangement of parts. The two cranks 1, are provided to accommodate two people sitting side by side in the pilot room in the front end of the plane so that either person can use a crank without changing seats.

Should the plane be small and only accommodate one person in the pilot's room, one of the cranks would be removed and the other one, sprocket and chain 2, would be placed well over to one side.

Multiple cylinder motors with fly-wheel and clutch are indicated at 4. They are placed crossways of the fuselage having center lines D, D, and spur gear 5, 5, drive the gear 6 on the drive shaft 7, see Figure 7.

Should the dimension of the plane be too small to accommodate the motors cross ways they can be placed length ways and drive the drive shaft through bevel gears quite as a tractor is driven.

Two motors could be located side by side in front or back of the drive shaft. Should the motors be placed in the front part of the fuselage the pilot's room or cockpit would be back of the drive shaft 7, and crank 1, chain 2, and counter shaft 8, would be placed back of the drive shaft 7. 9 indicates the propeller blades, 10, a sleeve member, having on its ends bearing part as 11, and on its central part gear housing 12. One end of each sleeve member 10 has a sprocket 13. I might mention here that the sprockets on the ends of counter shaft 8 and the sprocket on the inner end of sleeve member 10 could be changed to spur gears and if need be an intermediate gear, placed between them on either side of the fuselage without departing from the principle of constructed parts. 14 indicates the front lower wing and 15 the large upper wing, 16, the ailerons; web member 17 connects the upper wing 15 to lower wing 14 at the end of sleeve member 10 and its purpose is to give a supporting bearing for the sleeve member, it also is as a brace member between the wings, it also would tend to prevent a tailspin.

In a monoplane type the web member 17 may be attached only to the under side of the wing and terminate at the bearing 11. 18 and 19 are the plane rudders.

In Fig. 7, 20 and 20 are the bevel gears on shaft 7. Bevel gears 21 and 21 engage gears 20 and 20 and drive the propellers.

Now we come to Figs. 8, 9 and 10. Counter shaft 8, has a key at 22, a sliding sleeve 23 having annular groove 24 for collar 25 which in turn would have a suitable lever for its movements.

Part 25 is of common design and used on many machines, and a lever engages the two opposite rounded projections to move the collar sideways.

Bolts 26, 26, pass through short cylinders into the sprocket hub 27, rivets 28 hold cupped washer 29 to the sprocket 27'. Back of cupped washer 29 is a collar 30 that is pinned to shaft 8. Said collar 30 is used to keep sprocket from moving endways on the shaft 8, but allows it to rotate. The sliding sleeve 23 has two spiral slots 31 which, when assembled by bolts 26, 26, control the sprocket position of oscillation on shaft 8 and as the sprocket on the opposite end of shaft 8 to sprocket 27', is to be securely fixed thereto.

When a lever moves collar 25, back and forth the sprocket 27' oscillates on shaft 8 and thereby one of the propeller's axis moves from the parallel position of the axis of the other propeller axis and back again.

Going now to Fig. 6—32 indicates the floor of the pilot's room, 33 the foot lever having a part to engage the chain and 34 a spring to hold the foot lever in place.

The foot lever is simply a locking member and may engage the sprocket as well as the chain and may be made in various shapes. I wish now to mention that as the propellers are above and slightly to the rear of the lower wings, as there is a suction in front of the propellers, naturally the vacuum on top of the lower wings would be helped by the position of the propellers.

Now again it is the speed of the wind under a wing that gives the wing the lifting power from that side of the wing, the curve or angle of the wing changes the direction of the wind.

Therefore the proper place for the location of the propellers is in the front and below the wings and away from the fuselage for the reason before mentioned. The length of propeller blades on the front drive plane naturally would be longer than blades on my type of plane and there may be an advantage in having two or more on a side, with rather short blades, to get the maximum amount of artificial wind under the wings.

In Fig. 7, on the left end is bevel gear 35 which is the same as 21 but on the other side. Now to drive the blades in Figs. 3 and 4 with gears 21 and 35 would cause them to go in opposite directions; on the other end of the drive shaft is 38, an extension of the stem on 21 and by driving the blades of Figs. 3 and 4, would cause them to go in the same direction.

Having no propeller in front of the fuselage and only at the sides of the fuselage and with limited space to place the propellers it will be necessary to make the propellers smaller in sweep than a propeller on the front of the fuselage. Two or more sets of propellers on each side of the fuselage could be used having comparatively small sweep for each propeller and yet having the advantage of an artificial blast under a greater wing spread. Having propeller blades in front as well as to the back of the sleeve member would make a better balance and would make it easier for a pilot to change the position of the propellers while in flight.

To find out the value of 35 and 38 construction would be to give trial tests of each.

I have dotted a position of the propellers on Fig. 2 at M which shows blades getting farther from the upper wings as the sleeve member is oscillated down and it will be seen that in this dotted position M a vacuum is not formed under the upper wing.

The dotted position N of the propeller blades is a complete reverse for quick stop. The propeller blades on the right revolve in the opposite direction to the blades on the left, an advantage in steering.

The drive shaft should cross the fuselage at or near the center of gravity so that regardless of the oscillating position of the sleeve member and propeller blades, no diving or rearing should take place. I have shown the drive shaft midway of the height of the fuselage. The motor weight being quite near to the drive shaft simplifies the design for a strong stiff braced fuselage frame.

Quite different to that of the front drive, where the motor weight is at the extreme front end.

Various changes, proportion and the minor details of construction may be restored to without departing from the principle or sacrificing any of the advantages of the claimed invention.

Having described my invention, what I claim is:

1. An airplane of the biplane type having wings rigidly secured to the fuselage, the front edge of the upper wing being to the rear and over the back edge of the lower wing, frame members on each side joining the upper wing with the lower wing, said frame members supporting bearing midway between the upper and lower wings, the bearing position being in front of the upper wing and to the rear of the lower wing, sleeve members on either side of the fuselage are supported by said bearings, motor driven propellers are secured to said sleeve members and are located in front of the upper wing and to the rear of the lower wing and means to oscillate the sleeve members together with the propellers.

2. An airplane of the monoplane type having sleeve members on either side of the fuselage are provided by bearings at its ends, two or more sets of motor driven propellers are secured to said sleeve members and revolve at or near 90 degrees of the axis of said sleeve members, a wing is secured rigidly to the fuselage, at the outer ends of said sleeve members are web brace members that are rigidly secured to the underside of the wing and extend to the front, said web brace member support the said sleeve member at its bearings below the wing and to the front, the position of two or more sets of propellers on each side of the fuselage being below and to the front of the wing and means to oscillate the propellers.

3. An airplane of the biplane type having its wings secured rigidly to the fuselage, the lower wing being located in advance of the upper wing, brace members joining the upper and lower wings and support bearings midway, sleeve members turning in said bearings together with bearings at the fuselage sides, two or more sets of propellers are located on each side of the fuselage at different distances from the fuselage, said propellers are secured to the sleeve members by bearings in the sleeve members, means to oscillate the sleeve members thereby oscillating the several sets of propellers.

4. An airplane having in the fuselage one or more motors connected up to a drive shaft, said drive shaft extending out at both sides having sleeve members thereon, said sleeve members having a housing for bevel gears, said gears drive propellers, wings are secured rigidly to the fuselage and secured rigidly to the wings on their under side and extending beyond their front edge are web brace members, bearings are in the web brace members and support said sleeve members, the position of said propellers are below and in front of the wings and means to oscillate the sleeve members together with the said propellers.

5. An airplane of the biplane type having its wings secured rigidly to the fuselage, the lower wings being located in advance of the upper wings, one or more motors in the fuselage connected to a drive shaft that passes through the fuselage and out at each side, sleeve members inclosing the drive shaft on the outside of the fuselage, gear housings forming a part of the sleeve members inclose bevel gears which operate propellers, upper and lower wings are held together by brace members having bearings midway, said bearings support the outer ends of the sleeve members, the propellers are located midway between the upper and lower wings in front of the upper wings and to the rear of the lower wings for the purpose described, and means to oscillate the sleeve members likewise the propellers.

6. An airplane having sleeve members on either side held by bearings at its ends, motor driven propellers secured midway of said sleeve members, sprockets secured to the inner ends of said sleeve members, a counter shaft in the fuselage having a fixed sprocket on one end and loose sprocket on its other end, chains connecting said sprockets, a spiral slotted member is slidably secured to the counter shaft and telescopes the hub of the loose sprocket, screw bolts engage the said spiral slots and screw into said hub, the loose sprocket oscillates on the counter shaft in proportion to the sliding back and forth of the spiral slotted member and for the purpose described.

7. An airplane, whether of biplane, monoplane or twin wing plane type, having wings rigidly secured to the fuselage propeller blades pivoted to sleeve members, drive shaft passing through the fuselage and into the right and left sleeve member, bevel gears within the sleeve members drives the said propellers, bearings support the said sleeve members, a counter shaft in the fuselage, drive means connects the inner ends of sleeve members with outer ends of said counter shaft, a sprocket on the counter shaft is connected by chain to a sprocket in the pilot's cab, said sprocket in the pilot's cab has a crank attached thereto, a foot lever in the pilot's cab, when moved releases a catch that holds the chain fixed, said crank when rotated moves the propellers together with the sleeve members and for the purpose described.

8. An airplane, whether of biplane, monoplane or twin wing plane type, having wings rigidly secured to the fuselage, propeller blades pivoted to sleeve members, drive shaft passes through the fuselage and into the right and left sleeve members, bevel gears within the sleeve members drives the said propellers, bearings support the said sleeve members, sprockets and chain or its equivalent drive connects the inner ends of sleeve members to the ends of a counter shaft a spiral slotted member is slidably secured on the said counter shaft, a pin or screw engaging the said spiral slot and is rigidly connected to or forms a part of a sprocket at one end of the counter shaft, annular groove 24 forms a part of said spiral slotted member and collar 25 controls the backward and forward position of said spiral slotted member, said spiral slotted member likewise controls one sleeve member's oscillating position with respect to the other sleeve member.

9. An airplane, whether biplane or twin wing plane type, having wings rigidly secured to the fuselage and secured rigidly between the two right wings and rigidly between the two left wings are web or brace members, the said web or brace members having bearings secured thereto substantially midway between the two right and between the two left wings, bearings in the sides of the fuselage, sleeve members journalled in the two right and in the two left bearings, propeller blades pivoted to the said right and left sleeve members, drive shaft passes from the fuselage out at either side within the right and left sleeve members, bevel gears within sleeve members connects the drive shaft with the right and left propellers, means to oscillate the sleeve members.

10. An airplane, whether biplane or twin wing plane type, having wings rigidly secured to the fuselage and secured rigidly between the two right wings and rigidly between the two left wings are web or brace members, the said web or brace members having bearings secured thereto substantially midway between the two right and between the two left wings, bearings in the sides of the fuselage lines up with the bearings in the web or brace members, sleeve members journalled in the bearings, propeller blades pivoted to the sleeve members, a drive shaft passing through the fuselage also passing into the sleeve members, two motors in the fuselage one located in front and the other back of the drive shaft, each motor connected to the drive shaft by a common drive gear, hand controlled means to oscillate the sleeve members together with the propeller blades.

11. An airplane, whether biplane, monoplane or twin wing plane type, having wings rigidly secured to the fuselage, web or brace members secured rigidly to a wing or joining two wings together, said web or brace member having bearings secured thereto, bearings in the sides of the fuselage, sleeve members journalled in said bearings, drive shaft passes out of the fuselage at both sides into said sleeve members, bevel gears connect the drive shaft to propeller blades, said sleeve members having substantial flat surface on their lower sides and oval shaped surface on their top side thereby having their greater dimension front to back and lesser dimension top to bottom and means to oscillate the said sleeve members.

12. An airplane, whether biplane, monoplane or twin wing type, having wings rigidly secured to the fuselage, drive shaft extending out at both sides of the fuselage at right angles to the center line of the fuselage, outside of the fuselage and around the drive shaft are drive shaft supporting members, right and left propeller blades are pivoted to said drive shaft supporting members, bevel gears connects the drive shaft with propeller blades, means to oscillate the said drive shaft supporting members into different positions, the center line of rotation of the right and left propeller blades being less than ninety degrees with the center line of the drive shaft thereby under normal flying position of the propeller blades the air leaving the propeller blades goes back in a direction towards the fuselage tail, for the purpose set forth.

HERBERT ELLWOOD IRWIN.